United States Patent [19]

Emter

[11] Patent Number: 4,846,023

[45] Date of Patent: Jul. 11, 1989

[54] REGRINDING APPARATUS FOR CIRCULAR SAWS

[76] Inventor: James Emter, 23429 N.E. 29th Ave., Ridgefield, Wash. 98642

[21] Appl. No.: 788,925

[22] Filed: Oct. 18, 1985

[51] Int. Cl.[4] .............................................. B23D 63/14
[52] U.S. Cl. .......................................... 76/41; 51/42
[58] Field of Search ................... 76/37, 39, 41; 51/42, 51/40, 241 S

[56] References Cited

U.S. PATENT DOCUMENTS 4,366,728  1/1983  Beck et al. .............................. 76/41

Primary Examiner—Roscoe V. Parker
Attorney, Agent, or Firm—Chernoff, Vilhauer, McClung & Stenzel

[57] ABSTRACT

A circular saw regrinding apparatus includes a frame for supporting a pair of side-by-side mounted grinding wheels connected to spindles which are belt-driven by a pair of motors. The spindles are moved in a reciprocating fashion along their spin axes by a motor driven cam and tie-rod arrangement. The motors are gravity suspended below the spindles from bushed spindle clamps so that they are moved in unison along with the spindles thus obviating the need for motor mounting tracks and an expensive and complex reciprocating drive mechanism for the spindle-motor combination.

10 Claims, 2 Drawing Sheets

REGRINDING APPARATUS FOR CIRCULAR SAWS

BACKGROUND OF THE INVENTION

The following invention relates to a regrinding apparatus for a circular saw for sharpening each one of a plurality of teeth as each tooth is moved into engagement with a pair of grinding wheels.

Circular saws for use in the wood products industry comprise a flat disc having a plurality of saw teeth. The saw teeth are usually in the form of carbide tips which are secured to tooth-shaped cutouts in the circular disc. Periodically the saw teeth need to be resharpened. Such saw teeth are usually resharpened one tooth at a time in a machine that advances the circular saw one tooth at a time into engagement with spinning, grinding wheels mounted side by side. The grinding wheels are usually diamond wheels which are hard enough to sharpen the carbide tips of the circular saw.

In the past such machines tended to be very costly because of the number of parts and the amount of steel needed to fabricate those parts. Such machines are often extremely heavy so that vibration does not impair the accuracy of the sharpening operation. An example of such a machine is a CSA200 dual side grinder available from Industrial Machine Company of Battleground, Wash. The CSA200 machine includes a pair of diamond grinding wheels mounted on spindles which are moved longitudinally along their axes into engagement with saw teeth one at a time as the teeth are advanced into engagement with the wheels. The spindles are driven by motors connected thereto by belts and the motors are driven in unison with the spindles in the longitudinal direction. A motor mounting is provided for driving the motors along with the spindles along their longitudinal axes. Thus, in the CSA200 the motors are mounted on a track connected to the frame. A jack shaft, driven by a motor connected thereto by a sprocket and chain assembly, drives the motors along their respective tracks in unison with the spindles along their longitudinal axes. In this way the belts connecting the motor drive shafts to the spindles do not slip or get out of alignment. The drawback to this machine is that it is very expensive to include a large driving motor having sufficient torque to turn the jack shaft so as to move the spindle drive motors and the spindles at the same time. Since the motors are mounted on a track, the motor driving the jack shaft must overcome the friction of the heavy motors resting on the track. Additional expense is incurred in fabricating the tracks and linkages necessary to support the motors. In addition, means must be provided for maintaining proper tension on the belts. In the CSA200 this is provided by an adjustable spring-loaded rod that provides an upward bias on the spindles thus causing the belts to tighten.

SUMMARY OF THE INVENTION

The present invention provides an apparatus for eliminating many of the structural pieces needed to support the motors and to drive the motors along a track fixedly attached to the frame. This results in an attendant cost saving due to the elimination of a large number of steel parts in the machine while retaining its basic method of operation. This is accomplished by eliminating the support track for the motors together with the associated jack shaft and tie rod assembly, and by suspending the motors by gravity from a bushed spindle clamp attached to each of the spindles. This gravity suspension of the motors permits the motors to move longitudinally in unison with the spindles as they are moved along their respective longitudinal axes by a smaller motor. The bushed spindle clamps include arms fixedly secured thereto which extend downwardly below the top of the frame which supports the spindles. A pair of motor support plates are hingedly connected to the arms with a motor being affixed to each plate. A drive-belt connected between each respective motor drive shaft and the end of each spindle is kept at the correct tension by the weight of the motor which is free to rotate on its hinged motor support plate. This does away with the necessity for a separate tensioning means to keep proper tensioning between the drive belts and the spindles.

With the motor support track eliminated, a smaller motive means may be used for moving the spindles along their longitudinal axes in order to bring the grinding wheels into engagement with the teeth of the circular saw. This is accomplished by a gear motor which drives a circular cam connected to the bushed spindle clamps by a pair of tie-rods.

It is a primary object of this invention to provide a simple and cost effective apparatus for regrinding the teeth of circular saw blades.

Yet a further object of this invention is to provide a simplified mechanism for moving a pair of grinding wheels into engagement with the teeth of a circular saw blade.

A still further object of this invention is to provide a circular saw regrinding apparatus in which motors driving regrinding spindles with belts are suspended from the spindles so as to be driven longitudinally therewith so as to eliminate the need for track mounting the motors to a frame.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
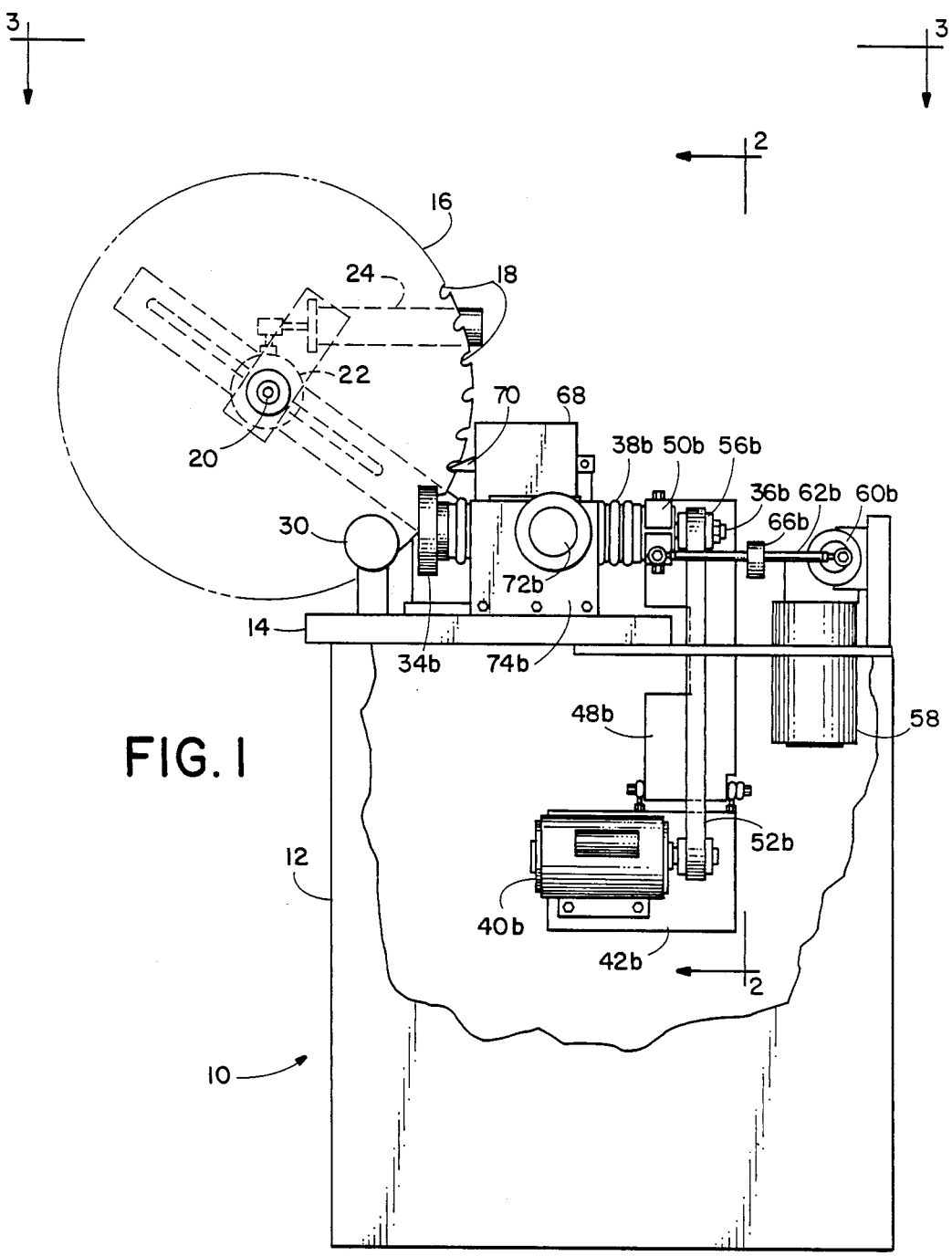
FIG. 1 is a partially cutaway side view of a circular saw regrinding apparatus.

A circular saw regrinding apparatus 10 includes a frame 12 which supports a table 14. A saw blade 16 comprising a plurality of teeth 18 is held by a clamping nut 20 to a spindle block 22. The spindle block 22 is connected to a pneumatic cylinder 24 which automatically rotates the circular saw blade 16. The spindle 22 and cylinder 24 are mounted on a support arm 26 which is pinned to the top of table 14 by a nut and bolt 28. The saw blade 16 is held in position by a pneumatically actuated clamp comprising a pneumatic piston and cylinder 30 and a stop 32. The teeth 18 of the circular saw 16 are sharpened by a pair of diamond grinding wheels 34a and 34b. These grinding wheels 34a and 34b are mounted to spindles 36a and 36b which are covered with dust covers 38a and 38b.

Figure 2:
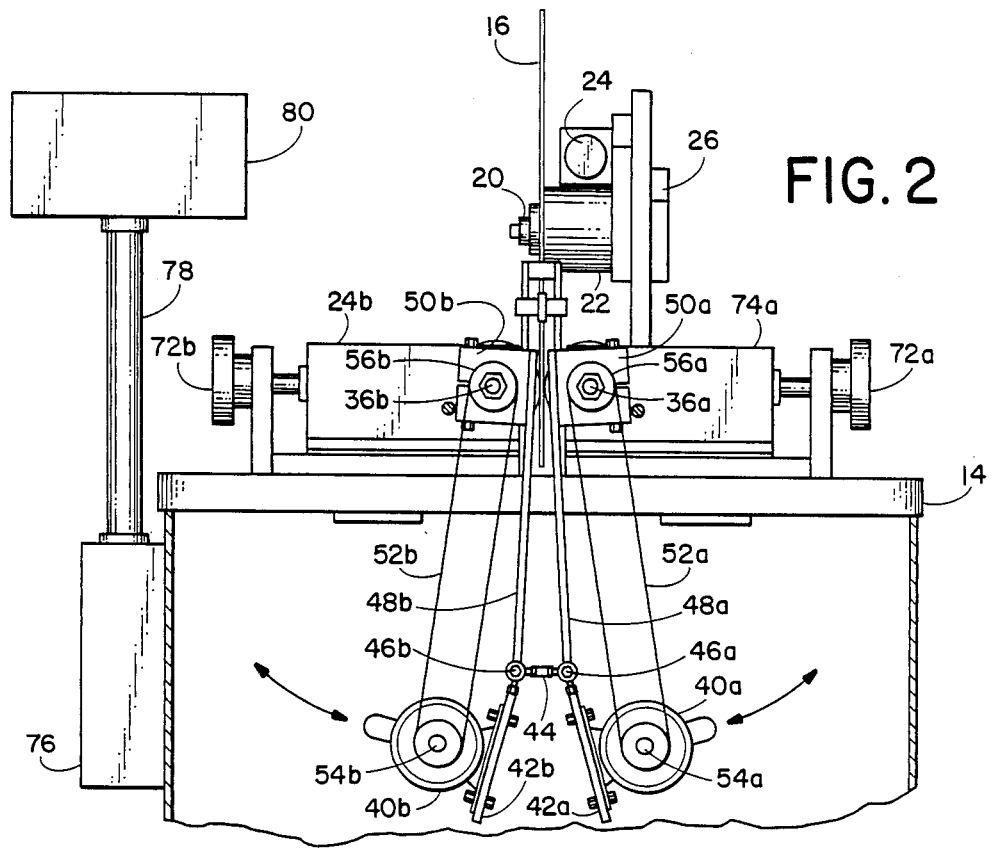
FIG. 2 is a partially cutaway rear view taken along 2—2 of FIG. 1.

As shown best in FIG. 2 the spindles 36a and 36b are driven by a pair of motors 40a and 40b which are mounted on motor mounting plates 42a and 42b. The motor mounting plates 42a and 42b are connected together by a tie-rod 44. The tie-rod connects a pair of spherical swivels 46a and 46b so that the motors 40a and 40b will have a limited degree of freedom about both a horizontal and a vertical axis. The motors 40a and 40b are suspended from the spindles 36a and 36b by mounting arms 48a and 48b which are connected to bushed spindle clamps 50a and 50b. A pair of belts 52a and 52b are used to drive the spindles 36a and 36b by transmitting torque from motor shafts 54a and 54b to a pair of spindle bushings 56a and 56b. Thus, the motors 40a and 40b are entirely gravity suspended from spindles 36a and 36b by being fixedly attached to bushed spindle clamps 50a and 50b. Since the motors 40a and 40b are held to arms 48a and 48b by swivels 46a and 46b the weight of the motors also serves to tension the belts 52a and 52b as shown by the arrows in FIG. 2.

The grinding wheels 34a and 34b are driven along the longitudinal axes of the spindles 36a and 36b in a reciprocating, or back and forth motion so that during a single stroke the grinding wheels cover the length of the particular saw tooth 18 to be sharpened. The driving mechanism comprises a gear motor 58 which drives a pair of jack shafts 60a and 60b. The ends of the shafts 60a and 60b form a cam as best illustrated in FIG. 1. A pair of tie-rods 62a and 62b are connected to swivel pins 64a and 64b on the ends of shafts 60a and 60b. Thus, as the shafts 60a and 60b rotate, the tie-rods 62a and 62b move back and forth. The other ends of the tie-rods 62a and 62b are connected to bushed spindle clamps 50a and 50b. A pair of counterweights 66a and 66b are included to stabilize the rods 62a and 62b. The bushed spindle clamps 50a and 50b are connected to the spindles 36a and 36b such that when the shafts 60a and 60b rotate the spindles are driven longitudinally along their respective spin axes in a back and forth motion. Since the motors 40a and 40b are carried on the bushed spindle clamps 50a and 50b, these motors move in unison h the spindles 36a and 36b.

An adjustable stop 68 which includes a tongue 70 provides an adjustment for saw 16 so that the degree to which the wheels 34a and 34b engage each of saw teeth 18 can be regulated. As the tongue 70 is adjusted to advance more deeply into the recess formed by one of the teeth 18, the tooth adjacent the grinding wheels is moved away from the point where the grinding wheels nearly intersect. In this way the degree of pressure exerted by the wheels on each of the saw teeth 18 can be adjusted.

Figure 3:
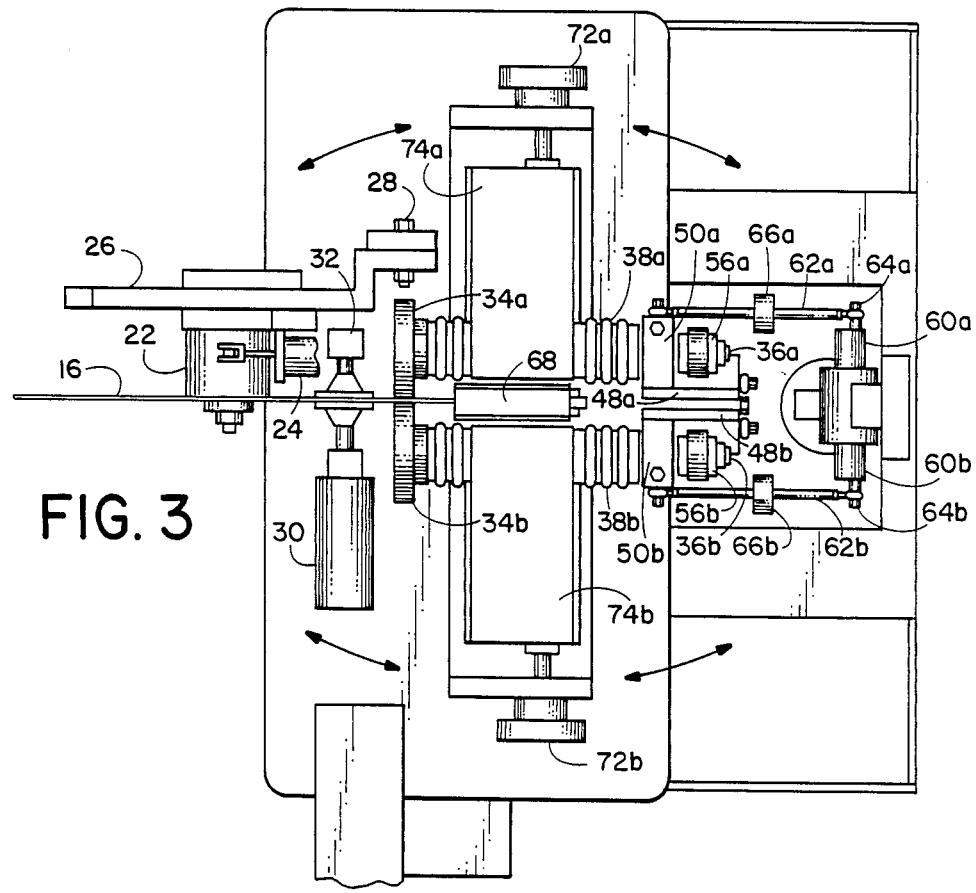
FIG. 3 is a top view taken along line 3—3 of FIG. 1.

The distance between the grinding wheels may also be regulated. This is accomplished by a pair of adjustment knobs 72a and 72b which move bushing blocks 74a and 74b either closer together or farther apart. The bushing blocks 74a and 74b are also rotatable about a vertical axis so that the angle of attack of the grinding wheels may be adjusted. This is a very fine adjustment and the angle varies by no more than 10 degrees. The freedom of movement of this 10 degree adjustment is provided by the manner in which the tie-rod 62a and 62b are connected to bushing blocks 50a and 50b and by the manner in which tie-rod 44 connects motor mounting plates 42a and 42b. All of the aforementioned mountings use spherical swivels for the respective tie-rod connections thus providing the necessary degree of rotatability. Thus, the arms 48a and 48b may rotate slightly about a vertical axis when the bushing blocks 74a and 74b are rotatably adjusted in the directions indicated by the arrows in FIG. 3.

Power is provided to the frame 12 by a wiring box 76 mounted on the side of the frame. A post 78 supports a switch box 80 which contains appropriate pilot lights and function controls for the motors 40a and 40b and 58 as well as pneumatic cylinders 24 and 30.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A regrinding apparatus for a circular saw comprising:
    (a) a frame supporting a pair of spindles;
    (b) a rotary grinding wheel connected to each of said spindles for engaging the teeth of said circular saw;
    (c) motive means for moving said spindles longitudinally; and
    (d) spindle drive means gravity suspended below said spindles to provide coupling thereto for imparting rotary motion to said grinding wheels, whereby said spindle drive means is moved in unison longitudinally with said spindles by said motive means.

2. The regrinding apparatus of claim 1 wherein said frame includes a bushing block supporting said spindles and having means for adjusting the angle at which said rotary grinding wheels engage said circular saw teeth.

3. The regrinding apparatus of claim 2 wherein said frame includes adjustable stop means for regulating the degree of pressure on each of said teeth from said grinding wheels as said teeth are moved into engagement therewith.

4. The regrinding apparatus of claim 3, further including saw tooth advancing means for rotating said circular saw to bring said teeth into engagement with said adjustable stop means one at a time.

5. The regrinding apparatus of claim 1 wherein said spindle drive means comprises a pair of motors, each of said motors having a drive belt for driving each of said spindles, respectively.

6. The regrinding apparatus of claim 5 wherein said motors are connected to motor support plates, said motor support plates being hingedly connected to respective mounting arms extending downwardly from each of said spindles, respectively.

7. The regrinding apparatus of claim 6 wherein said mounting arms are fixedly attached to bushed spindle clamps secured to each of said spindles, respectively.

8. The regrinding apparatus of claim 1 wherein said motive means comprises tie-rod means driven by a motorized cam for driving said spindles in reciprocating fashion along their respective longitudinal axes.

9. The regrinding apparatus of claim 8 wherein each of said tie-rods are connected respectively to a pair of bushed spindle clamps secured to each of said spindles.

10. The regrinding apparatus of claim 9 wherein said spindle drive means comprises a pair of motors suspended from respective mounting arms attached to said bushed spindle clamps.

* * * * *

UNITED STATES PATENT AND TRADEMARK OFFICE
CERTIFICATE OF CORRECTION

PATENT NO. :     4,846,023

DATED      :     July 11, 1989

INVENTOR(S) :    JAMES EMTER

It is certified that error appears in the above-identified patent and that said Letters Patent is hereby corrected as shown below:

Column 1, lines 8-9, change "engaqement" to --engagement--.

Column 3, line 39, delete "h" and insert "with".

Signed and Sealed this

Twenty-fifth Day of August, 1992

Attest:

DOUGLAS B. COMER

Attesting Officer            Acting Commissioner of Patents and Trademarks